Feb. 29, 1944.                M. WARE                2,342,989
                          VIBRATION DAMPER
              Filed May 28, 1941            3 Sheets-Sheet 3
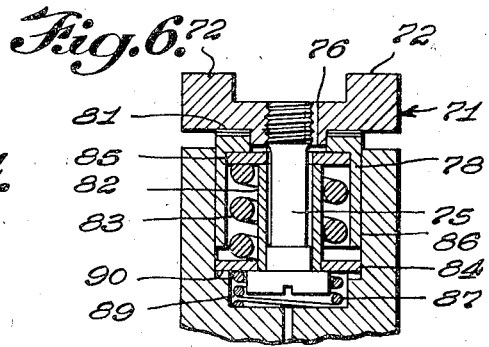
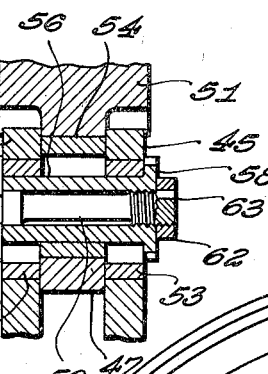
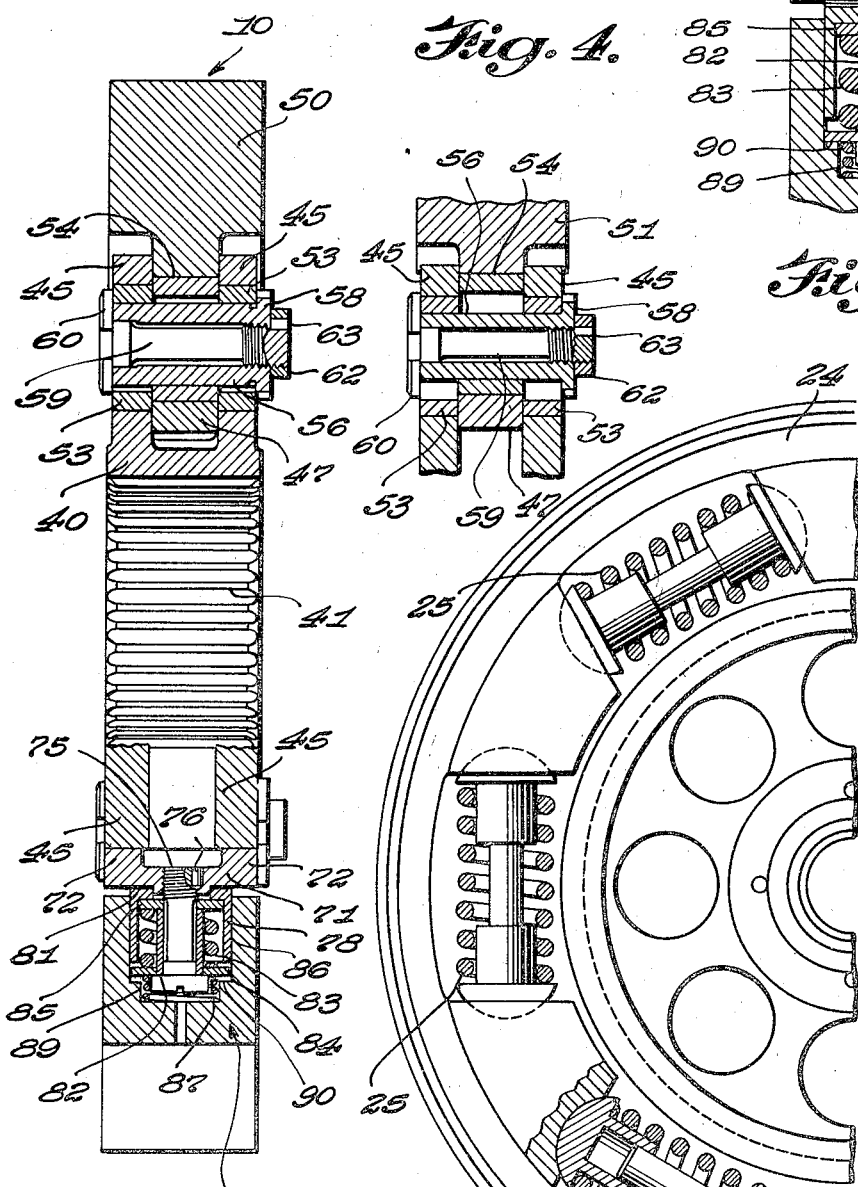
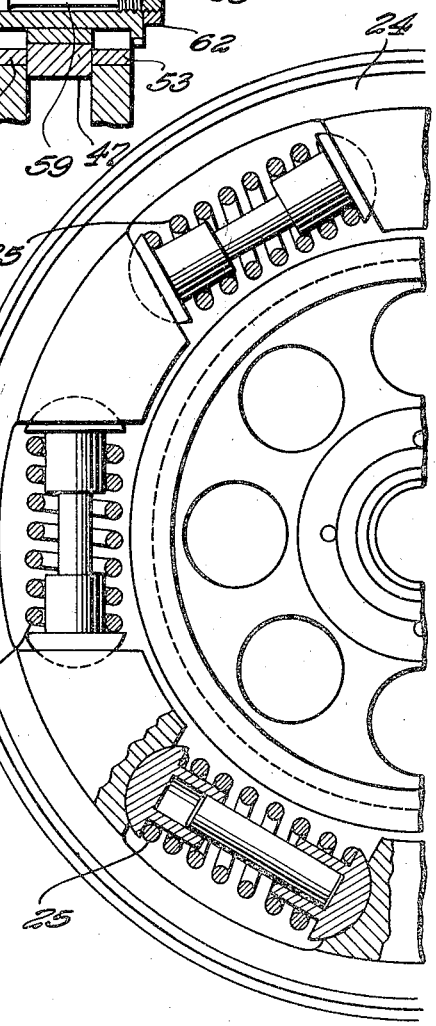
Inventor
Marsden Ware
By Watson, Cole, Grindle & Watson
Attorney Patented Feb. 29, 1944

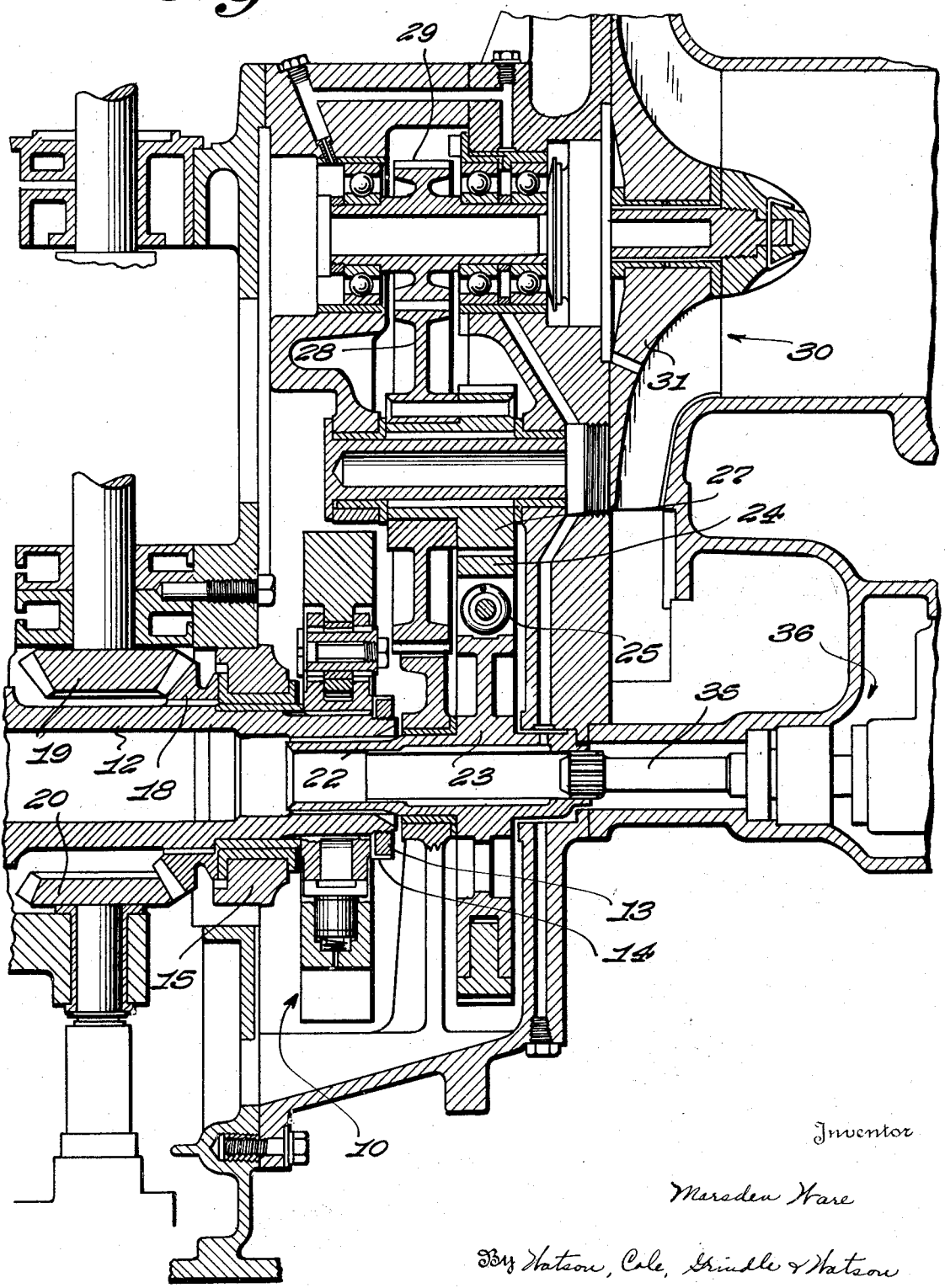

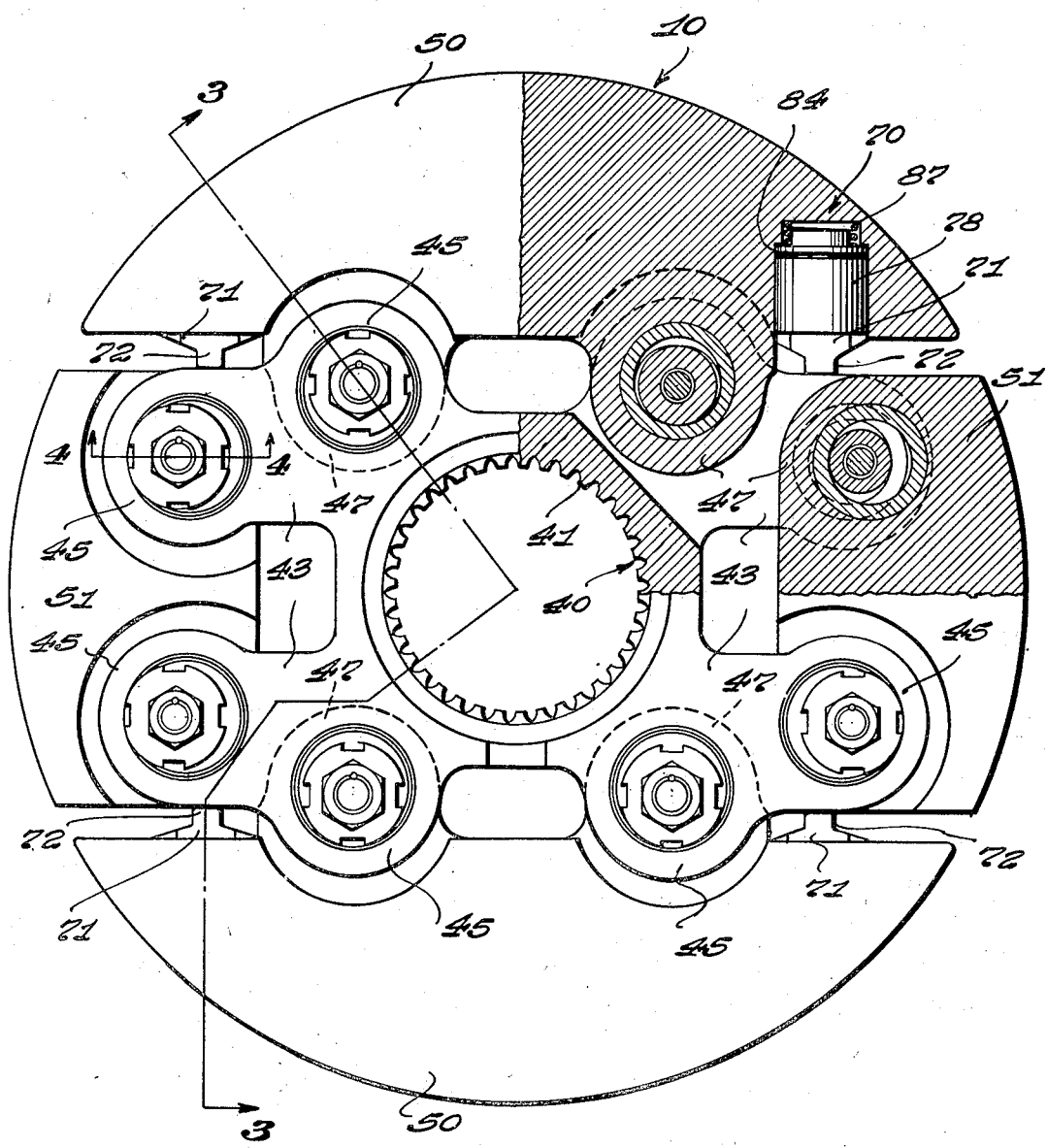

2,342,989

UNITED STATES PATENT OFFICE 2,342,989

VIBRATION DAMPER

Marsden Ware, Huntington Woods, Mich., assignor to Packard Motor Car Company, Detroit, Mich., a corporation of Michigan Application May 28, 1941, Serial No. 395,660

4 Claims. (Cl. 74—574)

This invention relates to improvements in means for minimizing the effect of undesirable vibrations and is particularly concerned with the damping of torsional vibrations induced in the crankshafts of internal combustion engines.

It is an object of the invention to provide an improved torsional damper which may be assembled as a unit for mounting directly on an engine crankshaft or extension thereof, or on a shaft driven from the crankshaft.

More specifically, it is an object of the invention to provide an improved vibration absorber of the so-called "pendulum" type, in which one or more movable masses are supported for pendulous movement through an arc of relatively small radius, frictional resistance to such movement being minimized. It can be shown that in this type of damper, torsional oscillations of the supporting shaft are resisted by the action of centrifugal force on the movably mounted mass, and it is proposed as part of the instant invention to augment this opposing force by the association with the movable mass of elastic means for alternately storing and returning to the mass energy derived from the movement thereof, thus reducing or limiting the amplitude of such movement.

It is a feature of the invention that the absorber or damper is so located with respect to auxiliary engine equipment driven from the crankshaft as to minimize the transmission of vibrations to such equipment and the driving means therefor. For example, in the preferred form of the invention, it is proposed to apply the damping means to an engine crankshaft, or an extension thereof, intermediate and in close proximity to two trains of gearing which serve respectively to drive the engine oil pump and the engine supercharger, so that the strain on this driving gearing is minimized.

Further objects and features of the invention will be apparent from the following description, taken in connection with the accompanying drawings, in which Figure 1 is a vertical longitudinal section through the end of an engine crankshaft, certain auxiliary engine equipment, and the driving means therefor, illustrating one method of applying the invention;

Figure 2 is an end elevation, partly in section, of a vibration absorber shown in Figure 1;

Figures 3 and 4 are sectional views taken respectively on the lines 3—3 and 4—4 of Figure 2;

Figure 5 is a fragmentary end elevation of a yieldable gear included in the driving means shown in Figure 1; and Figure 6 is an enlarged view of a portion of the structure shown in Figure 3.

In order to facilitate an understanding of the invention, reference will be made to the embodiments thereof illustrated in the accompanying drawings and specific language will be employed. It will nevertheless be understood that various further modifications of the devices illustrated herein, such as would fall within the province of those skilled in the art to construct are contemplated as part of the present invention.

The invention is found particularly effective when employed in association with high powered, high speed engines such as are now being manufactured for use in fast naval craft, and for airplanes, and is so illustrated in the accompanying drawings.

Thus, referring to Figure 1, it will be noted that the vibration absorber, indicated generally at 10, is shown as splined on one end of a crankshaft 12, being retained thereon against endwise displacement by a nut 13, threaded on the shaft end, suitable locking means 14 being associated with the nut to prevent unintentional displacement of the latter. Adjacent the absorber 10 and immediately to the rear of a bearing 15 for the crankshaft is a bevel gear 18 splined to the shaft and meshing with bevel gears 19 and 20. In the commercial application of the invention, the bevel gear 20 is employed to drive the engine oil pump and the fresh water pump which supplies cooling water to the engine. The bevel gear 19 drives the engine cam shaft.

Formed integrally or secured to a sleeve 22, splined within the crankshaft end and constituting an extension thereof is the hub 23 on which is rotatably mounted the toothed peripheral portion of a spur gear 24, one or more coil springs indicated at 25 being interposed between the hub and the toothed portion of the gear to afford a yielding drive, as shown more particularly in Figure 5. This gear serves to drive, through a train of spur gears 27, 28, and 29, a supercharger indicated generally at 30 having vanes 31, by which air under pressure is supplied to the intake manifold of the engine, not shown. An extension 35 of the crankshaft, connected for rotation with the crankshaft through the sleeve 22, is operatively connected to drive a pump indicated generally at 36, by means of which salt water is circulated through a jacket associated with the engine exhaust muffler to cool the latter.

It will be appreciated that it is highly desirable to minimize the strain imposed on the various devices just mentioned, and on the driving mechanism therefor, as the result of torsional vibrations inevitably induced in the crankshaft by the torque impulse periodically imparted thereto, and it is found that by locating the vibration absorber 10 as described, in juxtaposition to the driving means for these devices, the effectiveness of the absorber in the performance of its intended function is greatly increased. It is found particularly desirable to mount the absorber directly on the crankshaft or an extension thereof intermediate two gears by means of which torque is derived from the crankshaft for the driving of engine accessories, the operation of such accessories being perceptibly smoother and the life correspondingly increased.

Turning now to Figures 2, 3, and 4, in which a preferred form of torsional vibration absorber 10 is shown in more detail, it will be noted that the absorber comprises a hub portion 40 which is splined internally as indicated at 41 for convenience in mounting directly on the crankshaft or an extension thereof, as hereinbefore described. Extending outwardly from the central part of the hub portion are a plurality of arms 43, these arms being bifurcated, as shown more particularly in Figures 3 and 4, to provide spaced ears 45. Between each pair of ears is received, with a sliding fit, the inwardly directed flange 47 of an inertia mass. In the preferred embodiment, the inertia masses are of different size, there being illustrated a pair of oppositely disposed large masses 50, and a pair of oppositely disposed smaller masses 51 located intermediate the masses 50. Each mass is provided with two flanges 47, each flange being slidably received between a pair of ears 45 on the hub member 40.

The ears 45 of each pair are co-axially apertured for the reception of bushings 53. Each of the flanges 47 on the inertia masses is similarly apertured for the reception of a bushing 54. A sleeve 56, of less diameter than the internal diameter of the bushings 53 and 54, lies within the latter and is provided at one end with an external annular flange 58, formed to permit gripping by a tool, and with internal threads for the reception of a bolt 59, having a flanged head 60. Threaded on one end of the bolt is a nut 62 which is retained against unintentional displacement by a dowel pin 63. The parts are so dimensioned that the flange 58 on the sleeve 56 and the head 60 on the bolt 59 engage the ends of the bushings 53 snugly but with a sliding fit, so that both the sleeves 56 and the inertia masses 50 and 51 may partake of limited displacement in a plane perpendicular to the axis of the hub 40 and of the shaft 12 on which the hub is mounted.

Thus, when the crankshaft is rotating, each of the inertia members 50 and 51 will be urged radially outward under the action of centrifugal force, and the parts will occupy the positions in which they are shown in Figures 2 to 4, inclusive, the outward thrust on the masses being transmitted through the sleeves 56 to the ears 45 and thence to the hub 40. It will be observed, however, that the sleeves 56, being of less diameter than the bushings 53, may roll within the latter, and may concurrently roll within the bushings 54 of the inertia masses. Thus each of these points of support for each inertia mass constitutes the equivalent of an extremely short link, the sliding friction normally developed at the pivot points of the link being eliminated by the rolling action just mentioned. Each mass is thus supported for movement in an arcuate path, in which it occupies, in succession, a series of parallel positions by reason of the double link suspension or its frictionless equivalent.

When torsional vibrations are induced in the shaft, the shaft and the hub member which is mounted thereon oscillate slightly with respect to the inertia masses, the sleeves 56 rolling through a short arc within the bushings 53 as hereinbefore described. As the masses are thus displaced with respect to the hub in either direction from the central position in which they are shown in the drawings, they are simultaneously displaced inwardly by a slight amount, the force tending to displace them inwardly being thus opposed to the action of centrifugal force which continually urges the masses toward their central and outermost position. Thus as the shaft starts an oscillatory movement in one direction, the action of centrifugal force opposes this movement, and the movement is thereby partially absorbed or damped.

I have found that the effectiveness of this type of vibration absorber can be increased materially by the provision of means augmenting the action of centrifugal force in tending to urge the inertia masses toward their outermost positions. Preferably this means is of a resilient nature, functioning as an energy storing device, and I prefer to employ for this purpose a plurality of spring abutments 70 in association, at least, with each of the larger inertia masses 50.

Each abutment may comprise an element 71 having legs 72 for engagement respectively with the ears 45 of the pair of ears which supports the adjacent smaller inertia mass 51. Threaded within each element 71 is a bolt 75, secured against rotation therein by dowel pin 76. A cup-shaped member 78 surrounds the bolt 75, the bottom flange of the cup-shaped member seating against the element 71, or against one or more annular shims 81, which may be interposed therebetween. A sleeve 82 also surrounds the bolt 75 and forms with the cup-shaped member 78 an annular space for the reception of a relatively large coil spring 83, the spring abutting at one end against an annular element 85 seated within the base portion of the cup-shaped member and at its opposite end against an annular element 84. The structure just described is received within a conforming recess 86 formed in the inertia mass 50, and a smaller coil spring 87 is received in the upper end of this recess and acts against the annular element 84. It will be noted that the inner portion 89 of the recess 86 is of reduced diameter, so that an annular shoulder 90 is provided, there being a slight clearance between the element 84 and the shoulder 90, and between the element 84 and the adjacent end of the cup-shaped member 78 when the springs 83 and 87 occupy their normal position, these clearances being adjustable by the selection of an appropriate number of shims 81.

It will be appreciated that when relative oscillatory movement between the hub member 40 and the inertia masses 50 occurs, so that the masses are displaced from the positions in which they are shown in the drawings, the elements 71 will be displaced with respect to the inertia masses in which they are seated. As displacement is initiated, a thrust will be applied by the element 71 through the larger spring 83 to the annular element 84, which will then compress the lighter spring 87 to the extent permitted by the clearance between the element 84 and the shoulder 90, so that for relatively small displacements of the inertia masses, only the relatively light resisting force of the smaller spring 87 is effective. The normal action of the masses in absorbing vibrations is not affected by the springs 87, these springs acting merely to take up clearance between the legs 72 and the ears 45 with which they are engaged, whereby rattling is prevented. If, however, the amplitude of displacement of the inertia masses is considerable, the heavier springs 83 will be compressed, following compression of the light springs 87, to the extent permitted by the clearance between the cup-shaped member 78 and the annular element 84, so that displacements of large amplitude are resisted quite strongly, with resultant increased damping or absorbing action. When the springs 83 have been compressed to the maximum extent permitted, the parts just described afford a positive stop so as to limit displacement of the masses 50 to a predetermined maximum amplitude.

It will be understood from the foregoing that the spring abutments act as energy storing devices, serving to oppose displacement of the masses 50 from the normal outermost position while the potential energy of the springs is being increased, and returning this energy to the system as the springs expand. It will also be understood that the normal action of the masses is not affected by the springs unless and until vibrations of relatively large amplitude occur, such as might be induced at critical speeds. It is not contemplated that with this arrangement there is any substantial energy loss as the result of energy dissipation in the form of heat, the centrifugal masses functioning to absorb and reduce torsional vibration by the development of forces opposing this vibration to an extent which increases with the amplitude of the vibration.

By employing inertia masses of different size, I am enabled to absorb more effectively harmonics of different order. For example, the smaller masses 51 may be of such size as to damp the 4½ harmonic, while the larger masses 50 may be designed to deal particularly with the 6 harmonic. Various other factors, for example the radii on which the masses oscillate, may be similarly varied to compensate for certain vibrations of particularly objectionable amplitude.

Having thus described the invention, what is claimed as new and desired to be secured by Letters Patent is:

1. In a vibration absorber for a rotating shaft, the combination with a hub member formed for non-rotative, removable mounting on the shaft, of oppositely disposed inertia masses supported on said hub member for pendulous movement with respect thereto, the support for each mass including means affording a rolling connection between said mass and said hub member at points spaced circumferentially of the latter, the center of gravity of each mass being offset from the shaft axis, whereby relative oscillatory movement of said hub member and said masses resulting from torsional vibrations induced in said shaft are resisted by the action of centrifugal force on the masses, and elastic energy storing means acting between said hub member and said masses to augment such resistance to relative oscillatory movement thereof, and to alternately absorb and restore to the system without substantial loss the energy applied thereto.

2. In a vibration absorber for a rotating shaft, the combination with a hub member formed for non-rotative, removable mounting on the shaft, of oppositely disposed inertia masses supported on said hub member for pendulous movement with respect thereto, the support for each mass including means affording a rolling connection between said mass and said hub member at points spaced circumferentially of the latter, the center of gravity of each mass being offset from the shaft axis, whereby relative oscillatory movement of said hub member and said masses resulting from torsional vibrations induced in said shaft are resisted by the action of centrifugal force on the masses, and whereby strain imparted to said driving means and said equipment on the occurrence of torsional vibration in the shaft is reduced to a minimum, and elastic means acting between said hub member and said masses to augment such resistance to relative oscillatory movement thereof, said elastic means including relatively light spring means affording the sole resistance to oscillatory movement of small amplitude, and heavier spring means acting to resist relative oscillatory movement of greater amplitude.

3. In a vibration absorber for a rotating shaft, the combination with a member adapted to rotate with the shaft, of oppositely disposed inertia masses supported on said member for pendulous movement with respect thereto, the support for each mass including means affording a rolling connection between said mass and said member at points spaced circumferentially of the shaft, the center of gravity of each mass being offset from the shaft axis, whereby relative oscillatory movement of said member and said masses resulting from torsional vibrations induced in said shaft are resisted by the action of centrifugal force on the masses, and elastic means acting between said member and said masses to augment such resistance to relative oscillatory movement thereof, said elastic means being constructed and arranged to afford negligible resistance to oscillatory movement of small amplitude and substantially increased resistance to oscillatory movement in excess of a predetermined amplitude.

4. In a vibration absorber for a rotating shaft, the combination with a member adapted to rotate with the shaft, of oppositely disposed inertia masses supported on said member for pendulous movement with respect thereto, the support for each mass including means affording a rolling connection between said mass and said member at points spaced circumferentially of the shaft, the center of gravity of each mass being offset from the shaft axis, whereby relative oscillatory movement of said member and said masses resulting from torsional vibrations induced in said shaft are resisted by the action of centrifugal force on the masses, and elastic energy-storing means acting between said member and said masses to augment such resistance to relative oscillatory movement thereof, and to alternately absorb and restore to the system without substantial loss the energy applied thereto.

MARSDEN WARE.